US007967445B2

(12) United States Patent
Hamano et al.

(10) Patent No.: US 7,967,445 B2
(45) Date of Patent: Jun. 28, 2011

(54) IMAGE PROJECTING APPARATUS AND IMAGE PROJECTING METHOD

(75) Inventors: Yukiko Hamano, Kanagawa (JP); Ryosuke Kasahara, Kanagawa (JP); Toshiyuki Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 781 days.

(21) Appl. No.: 11/939,520

(22) Filed: Nov. 13, 2007

(65) Prior Publication Data

US 2008/0117387 A1 May 22, 2008

(30) Foreign Application Priority Data

Nov. 16, 2006 (JP) ................................. 2006-310602

(51) Int. Cl.
*G03B 21/00* (2006.01)
(52) U.S. Cl. ................ 353/31; 353/34; 353/28; 353/85; 353/97; 353/69; 353/70; 353/122; 382/162; 382/167; 382/254; 382/274; 382/275; 359/9; 359/10; 359/11; 359/21; 359/23; 359/32; 359/33; 359/237; 359/242; 359/259; 359/263; 348/744; 348/745; 348/806; 348/E9.012; 348/813; 348/E17.001; 348/E17.006; 348/E5.137; 362/318; 362/293; 362/294; 362/321
(58) Field of Classification Search .............. 353/85, 353/97, 69, 34, 28, 31, 70, 122; 382/162, 382/167, 254, 274, 275; 359/9, 21, 32, 33, 359/15, 10, 11, 23, 237, 242, 259, 263; 348/745, 348/744, 806, 807, 813, E17.001, E17.006, 348/E5.137, E9.012; 362/318, 293, 294, 362/321
See application file for complete search history.

(56) References Cited

U.S. PATENT DOCUMENTS

| | | | | |
|---|---|---|---|---|
| 6,538,705 | B1 * | 3/2003 | Higurashi et al. | 348/745 |
| 7,334,899 | B2 * | 2/2008 | Kobayashi | 353/69 |
| 7,377,657 | B2 * | 5/2008 | Morejon et al. | 353/85 |
| 7,403,318 | B2 * | 7/2008 | Miyazawa et al. | 359/242 |
| 7,422,331 | B2 * | 9/2008 | Matsuda | 353/69 |
| 7,673,958 | B2 * | 3/2010 | Heiles et al. | 347/19 |
| 7,714,943 | B2 * | 5/2010 | Bassi et al. | 348/744 |
| 2001/0022858 | A1 * | 9/2001 | Komiya et al. | 382/274 |
| 2005/0018144 | A1 * | 1/2005 | Wada et al. | 353/69 |
| 2005/0094108 | A1 * | 5/2005 | Kobayashi | 353/69 |
| 2005/0275809 | A1 * | 12/2005 | Ikebe et al. | 353/52 |
| 2007/0216979 | A1 * | 9/2007 | Li et al. | 359/15 |
| 2007/0230179 | A1 * | 10/2007 | Ripoll et al. | 362/277 |
| 2008/0106703 | A1 * | 5/2008 | Miyazawa | 353/84 |

FOREIGN PATENT DOCUMENTS

| | | |
|---|---|---|
| JP | 3264916 | 12/2001 |
| JP | 3357026 | 10/2002 |

* cited by examiner

*Primary Examiner* — Georgia Y Epps
*Assistant Examiner* — Sultan Chowdhury
(74) *Attorney, Agent, or Firm* — Dickstein Shapiro LLP

(57) ABSTRACT

An image projecting apparatus enables the formation of a projected image faithful to original image information by reducing degradation in the projected image due to decrease in imaging performance of a projection optical system. Image information is processed by an image processing device, which includes a first and a second image processor. A light modulating device modulates a flux of light emitted by an illumination optical system based on the processed image information. The modulated flux of light is projected on a screen by a projection optical system. If the image information processed by the first image processor in a pixel region is not within a representable modulation range of the light modulating device, the image information is processed by the second image processor.

5 Claims, 15 Drawing Sheets

IMAGE PROJECTING APPARATUS AND IMAGE PROJECTING METHOD

BACKGROUND OF THE INVENTION

1. Field of the Invention

The present invention relates to an image projecting apparatus and an image projecting method.

2. Description of the Related Art

As a result of the growth of electronic information media, there are increasing occasions where an image projecting apparatus (also referred to as "a projector") is utilized. A typical projector comprises an illumination optical system including a light source, and a light modulating device, such as a liquid crystal light valve, that modulates a flux of light emitted by the illumination optical system in accordance with image information that is entered externally. It also comprises a projection optical system, such as a projection lens, for projecting the flux of light modulated by the light modulating device on a screen as an enlarged image. Among others, a liquid crystal projector that employs an LCD device as a light modulating device is well-known. The liquid crystal projector, by which the screen size is readily adjustable and which has excellent color reproducibility, is widely used for conference room presentation purposes, for example.

The liquid crystal projector employs the LCD device as an image generator to generate an image which is projected by the projection optical system on a screen with magnification. The LCD device can be categorized as a scattering type, such as the polymer dispersed liquid crystal (PDLC) mode, or a polarizing type, such as the twisted nematic (TN) mode, based on its liquid crystal mode. It can also be classified as a transmission type or a reflection type, based on whether it transmits or reflects the illuminating light. The liquid crystal projector can be a single-plate type or a three-plate type, for example, depending on the number of liquid crystal panels used. In the case of a transmission-type liquid crystal projector, of which the outline of an optical arrangement and structure is shown in FIG. 1, a light source 1 emits a flux of light that is incident on a liquid crystal light modulator 3, which generates an image by determining whether the light flux should be transmitted on a pixel unit region basis. The thus generated image is then focused by a projection lens 4 onto a screen. The liquid crystal light modulator 3 is fed with an image signal 14 representing image information on a pixel unit basis. Lately, a digital micromirror array device (DMD) has also been developed as a light modulating device, other than the LCD device.

As the aforementioned type of projector becomes more and more widespread, the demand to simplify and reduce the size of the projector is rapidly increasing. In order to address such demand, one important issue is how to reduce the size or weight of the projection lens forming the projection optical system. The size or weight of the projection lens can be effectively reduced by reducing the number of individual lenses of which the projection lens is composed. However, reducing the number of the individual lenses generally results in a decrease in resolution, or degradation in imaging properties in terms of, e.g., distortion, chromatic aberration of magnification, and aberration.

With regard to the problem of aberration associated with the projection lens, a method to reduce such aberration in an image projected on the screen has been proposed. In this method, various aberrations that could develop due to the projection lens are estimated in the design stage, and the shape or structure of the light modulating device is adjusted to compensate in advance for the aberrations expected to be produced by the projection lens. For example, Japanese Patent No. 3264916 discloses a method whereby, in order to compensate for chromatic aberration, the size of the effective area of the light modulating device for the production of an image is varied depending on the wavelength. Japanese Patent No. 3357026 discloses a light modulating device whose shape is distorted or curved in a manner corresponding to the distortion or curvature caused by the projection lens.

As discussed above, various aberrations due to the projection lens can be reduced to some extent by appropriately designing the shape or structure of the light modulating device. However, such methods are still associated with the problem of how to prevent the decrease in resolution of the projection lens. When a projection lens is reduced in size or simplified, particularly for the purpose of reducing the size of the projector, its imaging performance tends to deteriorate at the peripheral portions of the image projected on a screen. With conventional methods, it has been difficult to compensate for such a decrease in imaging performance in such partial regions of the image.

SUMMARY OF THE INVENTION

It is a general object of the present invention to provide a novel and useful image projecting apparatus and method in which the above-mentioned problems are eliminated.

A more specific object of the invention is to provide an image projecting apparatus and an image projecting method whereby image degradation due to a decrease in imaging performance of the projection optical system can be reduced so that a projected image that is faithful to the entered image information can be produced.

In one aspect, the invention provides an image projecting apparatus comprising an illumination optical system configured to emit a flux of light; an image processing device configured to process image information; a light modulating device configured to modulate the flux of light emitted by the illumination optical system based on the image information processed by the image processing device; and a projection optical system configured to project the flux of light modulated by the light modulating device on a screen to form a projected image. The image processing device comprises a first image processor configured to process the image information on a pixel unit region basis, each pixel unit consisting of one or more pixels, so as to compensate for degradation in the image projected by the projection optical system; a determination unit configured to determine whether the image information processed by the first image processor on a pixel unit region basis is within a representable modulation range of the light modulating device; and a second image processor configured to process a part of the image information in a pixel region that is determined to lie outside the representable range.

In a preferred embodiment, the second image processor converts the part of the image information in the pixel region determined to lie outside the representable modulation range back to its original image information prior to the image processing by the first image processor.

In another preferred embodiment, the second image processor allocates an upper limit value of the representable modulation range to the part of the image information that exceeds an upper limit of the representable modulation range, and allocates a lower limit value to the part of the image information that drops below a lower limit of the representable modulation range.

In another preferred embodiment, the image projecting apparatus comprises plural image processing devices, one for each of two or more colors. In a pixel region where the part of the image information processed by the first image processor of a first image processing device for a first color is not within the representable modulation range, the second image processor of the first image processing device converts the part of the image information in the aforementioned pixel region back to its original image information prior to the image processing by the first image processor of the first image processing device. The second image processor of a second image processing device for a second color processes a part of the image information for the second color processed by the first image processor of the second image processing device that is in the same aforementioned pixel region with the same ratio of change as the ratio of change introduced into the part of the image information for the first color in the pixel region by the processing by the second image processor of the first image processing device.

In yet another preferred embodiment, the image projecting apparatus comprises plural image processing devices, one for each of two or more colors. In a pixel region where the part of the image information processed by the first image processor of a first image processing device for a first color is not within the representable modulation range, the second image processor of the first image processing device allocates an upper limit value to a part of the image information that exceeds an upper limit of the representable modulation range, and allocates a lower limit value to a part of the image information that drops below a lower limit of the representable modulation range. The second image processor of a second image processing device for a second color processes a part of the image information for the second color processed by the first image processor of the second image processing device that is in the same aforementioned pixel region with the same ratio of change as the ratio of change introduced into the part of the image information for the first color in the pixel region by the processing by the second image processor.

In another preferred embodiment, the illumination optical system comprises a light-amount distribution controller configured to control the distribution of light amount in the cross section perpendicular to the light flux.

In yet another preferred embodiment, the illumination optical system comprises a light-amount distribution controller configured to control the distribution of light amount in the cross section perpendicular to the light flux.

In a further preferred embodiment, the illumination optical system comprises a light-amount distribution controller configured to control the distribution of light amount in the cross section perpendicular to the light flux.

In yet another preferred embodiment, the light-amount distribution controller comprises a light-amount equalizer configured to obtain a uniform distribution of light amount in the cross section perpendicular to the flux of light; and a light-amount distribution converter configured to obtain a light-amount distribution in the cross section perpendicular to the flux of light such that the light amount increases from a center portion toward a peripheral portion.

Preferably, the light-amount distribution converter comprises a bispheric lens.

Preferably, the light-amount distribution controller comprises a computer-generated hologram element in which a computed digital pattern is recorded.

In another aspect, the invention provides a method for projecting an image on a screen using an image projecting apparatus. The apparatus comprises an illumination optical system configured to emit a flux of light, an image processing device configured to process image information, a light modulating device configured to modulate the flux of light emitted by the illumination optical system based on the image information processed by the image processing device, and a projection optical system configured to project the flux of light modulated by the light modulating device onto the screen to form a projected image. The method comprises a first image processing step of processing the image information on a pixel unit region basis, each unit consisting of one or more pixels, so as to compensate for degradation in the projected image projected by the projection optical system; a determination step of determining whether the image information processed by the first image processing step on a pixel unit region basis is within a representable modulation range of the light modulating device; and a second image processing step of processing the part of the image information in a pixel region that is determined to be outside the representable modulation range in the determination step.

Preferably, the second image processing step comprises converting the part of the image information back to its original image information prior to the first image processing step.

Preferably, the second image processing step comprises allocating an upper limit value to a part of the image information that exceeds an upper limit of the representable modulation range of the light modulating device, and allocating a lower limit value to a part of the image information that drops below a lower limit of the representable modulation range.

In accordance with the image projecting apparatus and method of the present invention, degradation in an image due to a decrease in imaging performance of the projection optical system can be eliminated or reduced, whereby a projected image that is faithful to originally entered image information can be obtained.

DETAILED DESCRIPTION OF THE PREFERRED EMBODIMENTS

An image projecting apparatus and image projecting method of the present invention are described by way of several embodiments thereof.

Embodiment 1

Figure 1:
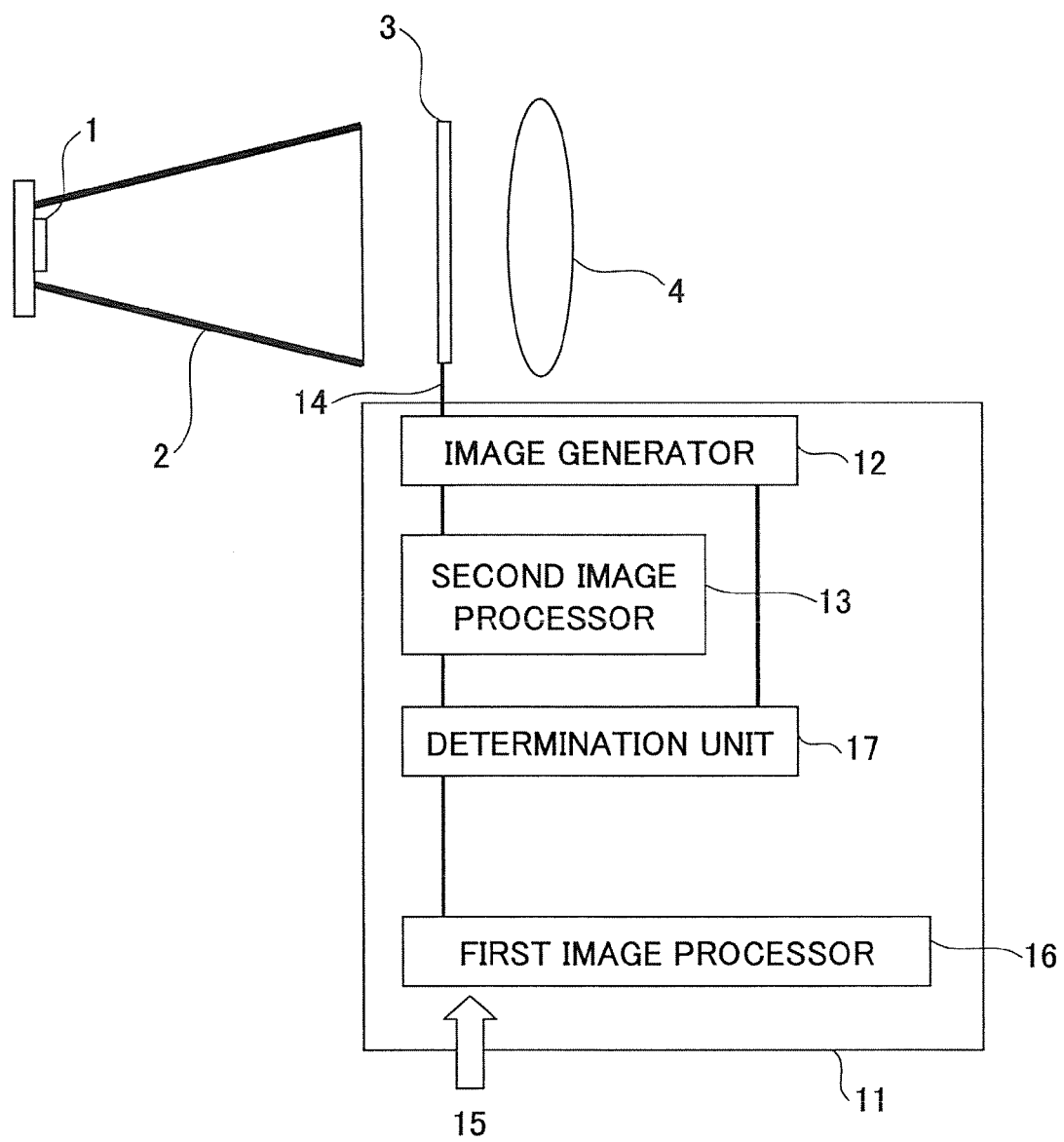
FIG. 1 schematically shows a projector according to an embodiment of the present invention.

FIG. 1 shows a diagram of an image projecting apparatus ("projector") according to a first embodiment of the invention. The projector comprises a light source 1, a rod integrator 2, a liquid crystal light modulating device 3, and a projection lens 4. An image signal 14 carrying image information fed to the liquid crystal light modulating device 3 on an individual pixel region basis is supplied from an image processing device 11. The image processing device 11 comprises a first image processor 16, a determination unit 17, a second image processor 13, and an image generator 12. The image processing device 11 processes an original image 15, i.e., the externally entered image information, and outputs the image signal 14.

Light Source

Figure 9:
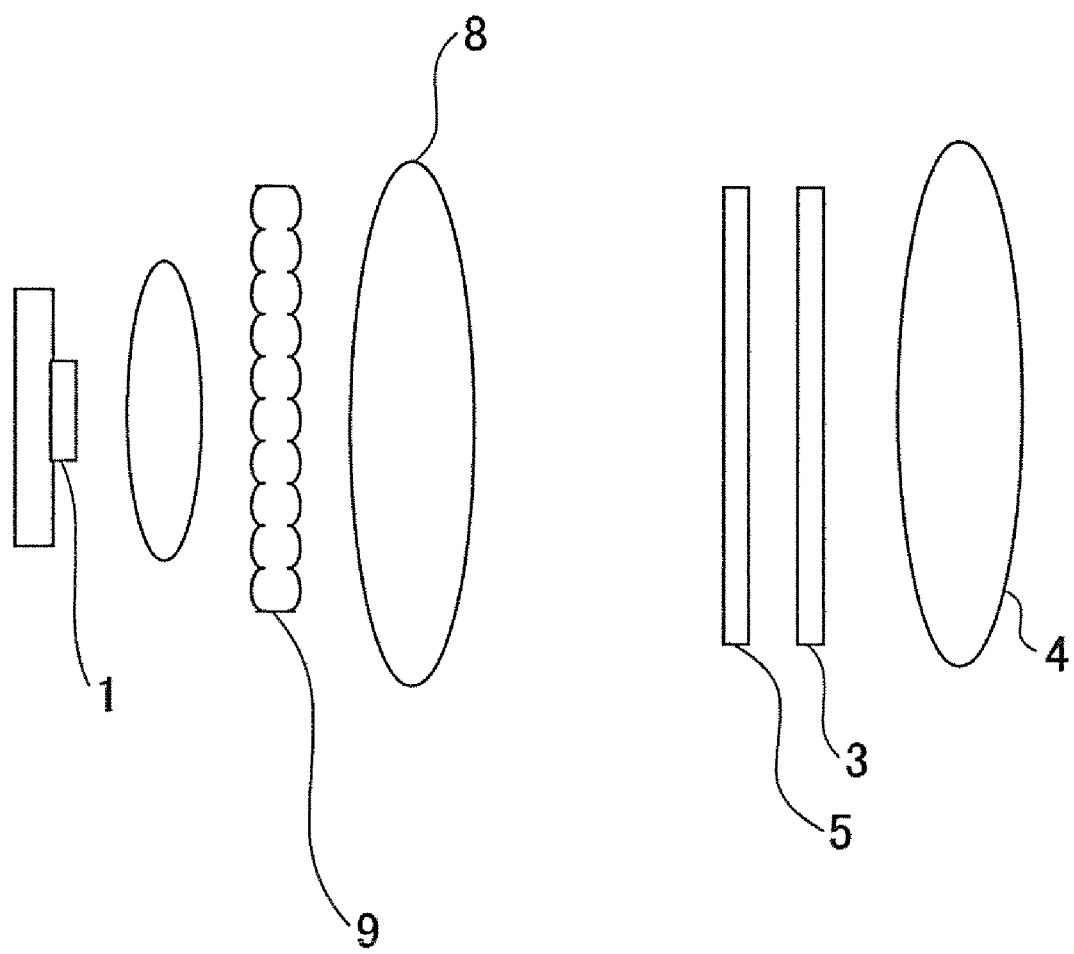
FIG. 9 schematically shows an illumination optical system and a projection optical system according to another embodiment of the invention.

The light source 1 is composed of plural light-emitting diodes ("LEDs") that are arranged, e.g., two-dimensionally. The light source 1 is preferably configured such that the light-emitting portions of the LEDs are housed within the rod integrator 2, so as to prevent light leakage. The LEDs are configured such that they can emit simultaneously based on power supplied by an external power supply (not shown). Each LED emits monochromatic light of one of the three primary colors, i.e., red, green, and blue, which are arranged in a predetermined pattern such that the LEDs can produce white flat light when they are all turned on. While in the above configuration the light source 1 consists of LEDs, a light source based on a different emission principle may be used, such as, e.g., a semiconductor laser, which is a point light source requiring less power for the emission of light. To eliminate optical intensity irregularity, a fly's eye integrator 9 may be provided in the illumination optical system, as shown in FIG. 9.

Rod Integrator

The rod integrator 2 is a tapered, hollow rectangular column widening toward the end, composed of plural (such as four) wall surfaces. Its internal walls consist of reflecting surfaces. In one example, the rod integrator 2 may consist of four mirrors of identical size that are affixed to each other such that the mirror surfaces are opposite each other in pairs. Alternatively, a resin plate or the like may be coated with a thin film of metal, such as aluminum, by vapor deposition or with a reflecting film glued with adhesive, and four such plates may be affixed to each other. Regardless of the structure, preferably the internal walls of the rod integrator 2 are finished with a sufficiently smooth mirror surface that can totally reflect light, so as to reduce loss of light. The flux of light is reflected by the wall surfaces as it is guided through the rod integrator 2, producing a uniform distribution of light amount at the end plane toward the exit of the rod integrator 2. Thus, the rod integrator also functions as a light-amount distribution controller, as will be described later. The structure of the rod integrator 2 is not limited to the above-described example. For instance, the rod integrator 2 may be made of a solid, transparent material with an optical guide function; the shape is not limited to the tapered one but may be rectangular-cylindrical or columnar, for example.

Image Processing

Figure 10:
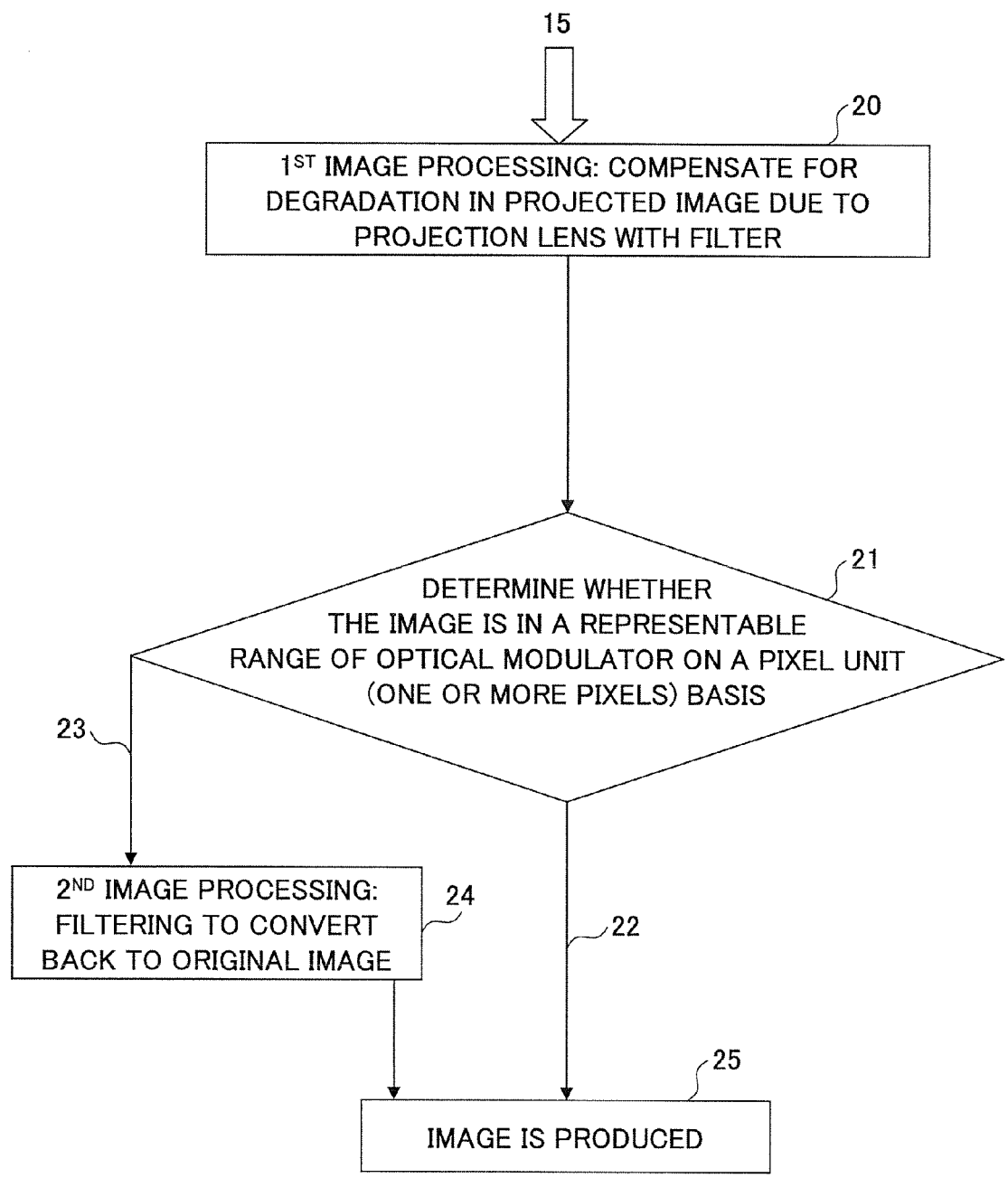
FIG. 10 shows a flowchart of image processing according to an embodiment of the invention.

In the present embodiment, it is possible to compensate for the degradation in a projected image caused by a decrease in imaging performance of the projection lens in the projection optical system upon reduction of the number of its individual component lenses for simplification purposes. Specifically, the image information fed to the light modulating device is processed by image processors so as to control the image information based on which the flux of light emitted by the light modulating device is modulated. An example of such image processing is described below with reference to a flowchart shown in FIG. 10. The original image 15 fed to the image projecting apparatus is subjected to a first image processing in the image processing device 11, whereby inverse filtering is performed to compensate for the degradation in the projected image due to the projection lens (step 20). In this step, an inverse filter adapted to compensate for the decrease in the modulation transfer function (MTF; a lens performance parameter used for evaluating the contrast reproducibility of a projection lens) of the projection lens is used, for example. It is then determined whether the inverse-filtered image is within a modulation range allowing it to be represented by the light modulating device ("representable modulation range"), in units of one or more pixels (step 21). In the present example, the determination is made on a pixel unit region basis, each unit consisting of 2 pixels×2 pixels=4 pixels. If the inverse-filtered image information is within the representable modulation range of the light modulating device, the image information in the representable pixel region (22) is sent to the image generator as is. The image information in an unrepresentable pixel region (23) is filtered in a second image processor on an individual pixel region basis, so as to render it back to the image information of the original image 15 (step 24). The restored, i.e., original, information is sent to the image generator, where it is combined with the image information (22) in the representable pixel region, thus producing final image information (step 25).

Figure 4:
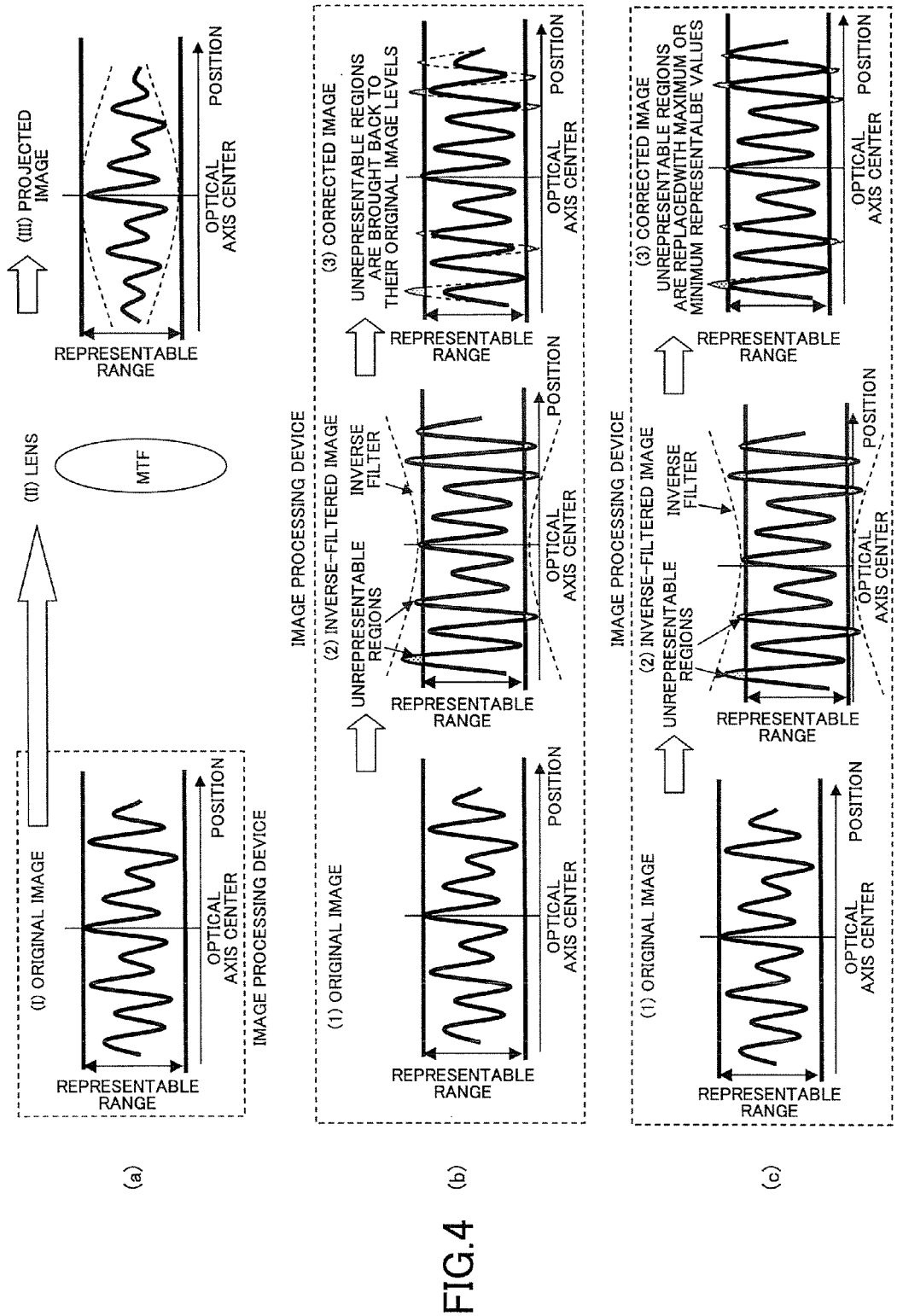
FIG. 4 illustrates the concepts of image processing according to prior art (a) and embodiments (b and c) of the invention.

The above image processing is described with reference to FIG. 4. The horizontal axis in each of the charts in FIG. 4(a) shows the position of the light modulating device (in the lateral direction, for example), with the center indicating the optical axis center. The vertical axis shows the amount of light (intensity level) in each pixel region. The representable modulation range of image information refers to a range of intensity levels allowing the image information to be projected by the projector using the light modulating device. The maximum level (upper limit) corresponds to white and the minimum level (lower limit) corresponds to black. If the light amount level of the image information is outside the representable range, the light modulating device is unable to accurately modulate the illuminating light. As a result, the projected image obtained with the inaccurately modulated light tends to suffer from degradation in imaging performance, such as distortion, a decrease in resolution, or color unevenness. Thus, normally, the original image, i.e., the image information entered externally into the projector, is processed so as to make its light amount levels stay within the representable range of the light modulating device.

It is known that, as the flux of light for the projection image corresponding to the original image (I) produced by the light modulating device is focused by the projection lens and projected onto the screen, the light amount level decreases as shown in a projected image (III) due to the imaging performance of the projection lens (II). Particularly, the decrease becomes more pronounced from the optical axis center toward the peripheral portions of the projection lens, with a resultant decrease in imaging performance. As a result, as shown in FIG. 4(a), the resolution of the projected image drops increasingly from the optical axis center toward the peripheral portions. In order to compensate for such degradation in imaging performance of the lens, the image information is subjected to image processing prior to entry into the light modulating device.

FIG. 4(b) illustrates how the image information is altered by the first image processor and the second image processor. In the case where the original image (1) is processed by the first image processor alone, image information is generated by inverse filtering of the original image. Inverse filtering involves an inverse computation to inversely deform the image information so as to compensate for its deformation due to the drop in the MTF of the projection lens. This image processing makes it possible to obtain image information within the representable modulation range as long as the original image is not extremely close to either white or black. Thus, even if the imaging performance of the lens is degraded, the original image can be accurately reproduced in the projected image by such inverse filtering. In this way, even with a lens with a degraded MTF, a high-quality projected image can be provided by performing correction with the first image processor.

However, if there is a portion (pixel region) in the inverse-filtered image information (2) that exceeds the representable modulation range of the light modulating device, as shown in the middle of FIG. 4(b), i.e., if the original image has a portion (pixel region) that is white or black, or extremely close to either, modulation by the light modulating device may contribute to the development of imaging defects in the projected image. Such a pixel region that exceeds the representable modulation range of the modulating device tends to occur particularly in a peripheral portion away from the optical axis center, due to the inverse filtering characteristics. Specifically, this is due to the strong inverse filtering that is effected in the original image to compensate for the drop in imaging performance, which tends to occur in a peripheral portion away from the optical axis center, due to the property of the lens. If such image information is fed to the light modulating device as is to form a projected image, distortion develops in the projected image.

Therefore, in the present invention, such inverse-filtered image information is processed by the second image processor. The inverse-filtered image information contains two kinds of unrepresentable pixel regions, i.e., an underflow in which the region drops below the lower limit of the representable modulation range of the light modulating device, and an overflow in which the region exceeds the upper limit of the representable modulation range. Thus, the underflow and overflow portions are detected on a pixel unit region basis, each unit consisting of one or more pixels, and only those pixel regions corresponding to the underflow or overflow portions are determined to be unrepresentable regions. The image information in such pixel regions is converted back to the original image levels so as to avoid the overflow and underflow. In other words, the second image processing is effected on a pixel region basis whereby the image information is partially modified back to the original image levels. The image information of the thus corrected image (3) is illustrated on the right side of FIG. 4(b). Based on such image information, the light modulating device produces a modulated flux of light, which is projected on the screen by the projection optical system. The projected image, though not a perfect reproduction of the original image, can be one of high quality.

Color Projector

In a case where a projected image is produced by composing the fluxes of light for the three primary colors, i.e., red (R), green (G), and blue (B), in a color projector, three sets of image processing devices and light modulating devices are also provided. If a pixel region is determined to be an unrepresentable region in any of the colors R, G, or B, preferably the image information in the same pixel region for the other colors is also determined to be an unrepresentable region. The image information for such a pixel region is therefore subjected to the aforementioned second image processing, so as to restore the intensity levels of the original image. In this way, not only can the distortion in the projected image be reduced, but also the balance among the colors R, G, and B can be maintained, resulting in good color reproducibility. In this case, the limits of the representable range of the light modulating device during image processing in each color are defined by the upper and lower limits of the representable luminance of each color, instead of white and black.

Figure 6:
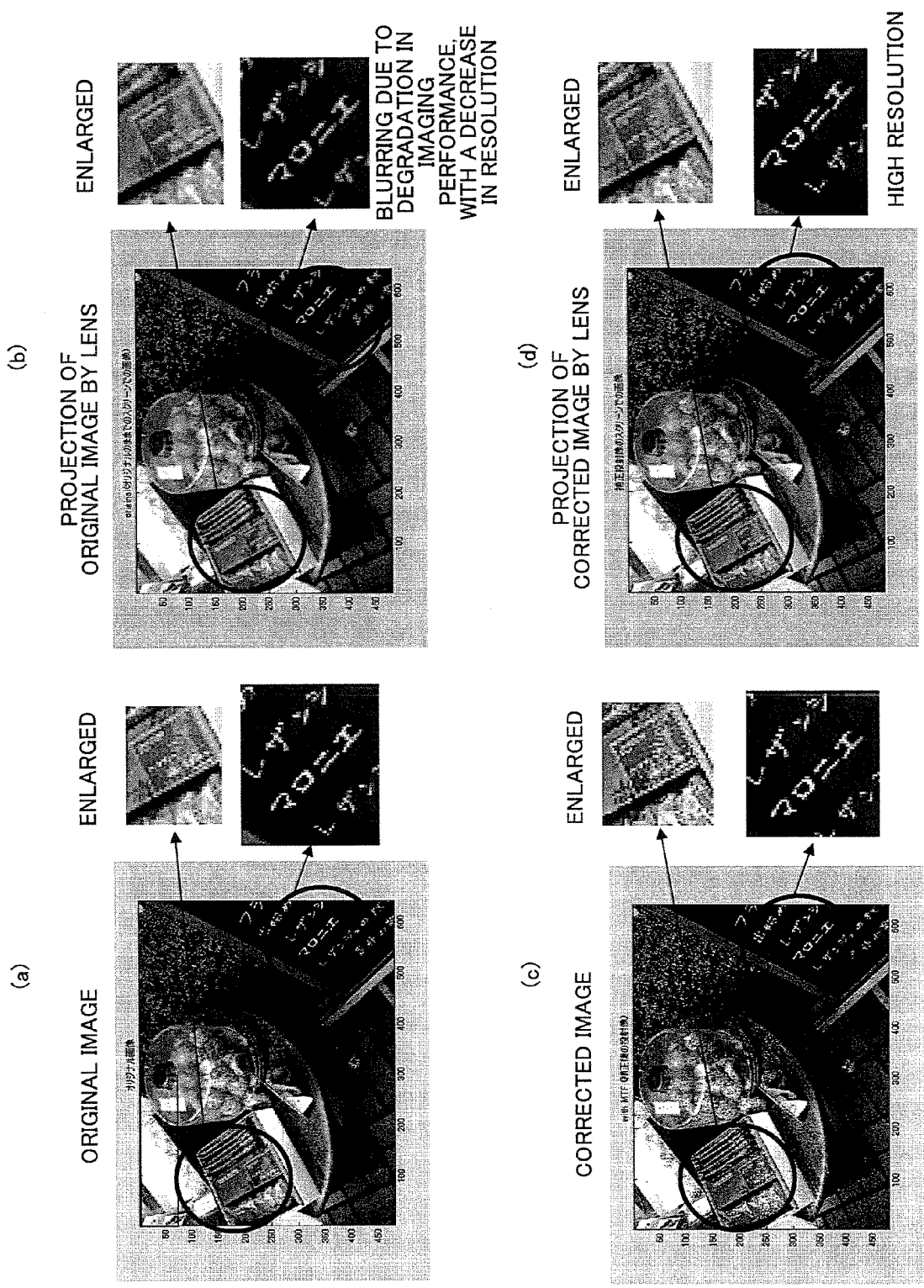
FIG. 6 shows the results of a simulation of image processing according to the embodiment shown in FIG. 4(b).

FIG. 6 shows the result of a simulation of the above embodiment. FIG. 6(a) shows an original image 15. When the original image 15 is projected as is, an image of FIG. 6(b) results. In this image, blurring is caused by the imaging performance of the lens, with a resultant drop in resolution. FIG. 6(c) shows an image produced by the image generator following image processing by using the inverse filter adapted to compensate for the drop in the lens MTF in the image processing device. The image information following such image processing is sent to the liquid crystal light modulating device 3 by way of the image signal 14, and then the light flux modulated by the liquid crystal light modulating device 3 is projected by the projection lens 4, resulting in an image of FIG. 6(d). It can be seen that resolution is enhanced and the image is of high quality, compared with FIG. 6(b). It is noted that although FIG. 6 is in monochrome, the actual images are implemented in color.

Embodiment 2

In Embodiment 2, a projector is described that comprises a second image processor employing a different image processing method from the second image processor of Embodiment 1. The present embodiment provides an image projecting method and apparatus whereby, as in the foregoing Embodiment 1, a pixel region that is determined by the determination unit to contain image information that has overflowed or underflowed is subjected to image processing in the second image processor. Specifically, the second image processor substitutes an overflow or an underflow region with an upper limit or a lower limit of the representable range of the light modulating device. Based on the image information thus processed in the second image processor, the flux of light from the illumination optical system is modulated by the light modulating device. The modulated flux of light is projected by the projection optical system on a screen to form a projected image.

Second Image Processing

With reference to FIG. 4(c), the image processing is described. When the original image (1) shown in the left-hand section of the figure is subjected to the same inverse filtering as in Embodiment 1, the inverse-filtered image information (2) shown in the center is obtained. As shown, the image information exceeds the representable range in some pixel regions thereof, resulting in overflows and underflows that cannot be represented. If a projected image is produced based on such image information as is, distortion is caused in the projected image, as described above. Thus, the underflow portion that drops below the lower limit of the representable modulation range and the overflow portion that exceeds its upper limit are detected on a pixel unit region basis. Only the pixel region that has underflowed or overflowed is determined to be an unrepresentable region. In the second image processing in accordance with this embodiment, the image information that has overflowed is replaced with the upper limit, i.e., the maximum representable value, of the modulation range of the light modulating device. On the other hand, the image information that has underflowed is replaced with the lower limit, i.e., the minimum representable value, of the modulation range of the light modulating device. In this way, the overflow and underflow of the image information are corrected. In other words, only the pixel region that is determined by the determination unit to be an unrepresentable region is subjected to the above second image processing on a pixel region basis. As a result of the second image processing, a corrected image (3) is obtained, as shown on the right side of FIG. 4(c). Based on the thus obtained image information, a projected image can be produced as described above which, though not a perfect reproduction of the original image, is very close to it and of high quality.

Color Projector

In a case where the fluxes of light for the three primary colors of red (R), green (G), and blue (B) are composed to produce a projected image in a color projector, if a pixel region is determined to be an unrepresentable region in any of the colors R, G, and B, preferably the same region is also determined to be unrepresentable for the other colors and subjected to the second image processing. In this case, with regard to the color in which a region is initially determined to be unrepresentable, the overflow portion is replaced with the maximum representable value and the underflow portion is replaced with the minimum representable value, on a pixel region basis. For the other colors, the image information in each color is processed so that the same ratio of RGB as in the image information of the original image can be obtained. In this way, not only can the distortion in the projected image be reduced, but also the balance among the R, G, and B image information sets can be maintained, resulting in good color reproducibility. The limits of the representable range of the light modulating device during image processing for each color are defined by the upper and lower limits of the representable luminance of each color, instead of white and black.

Figure 12:
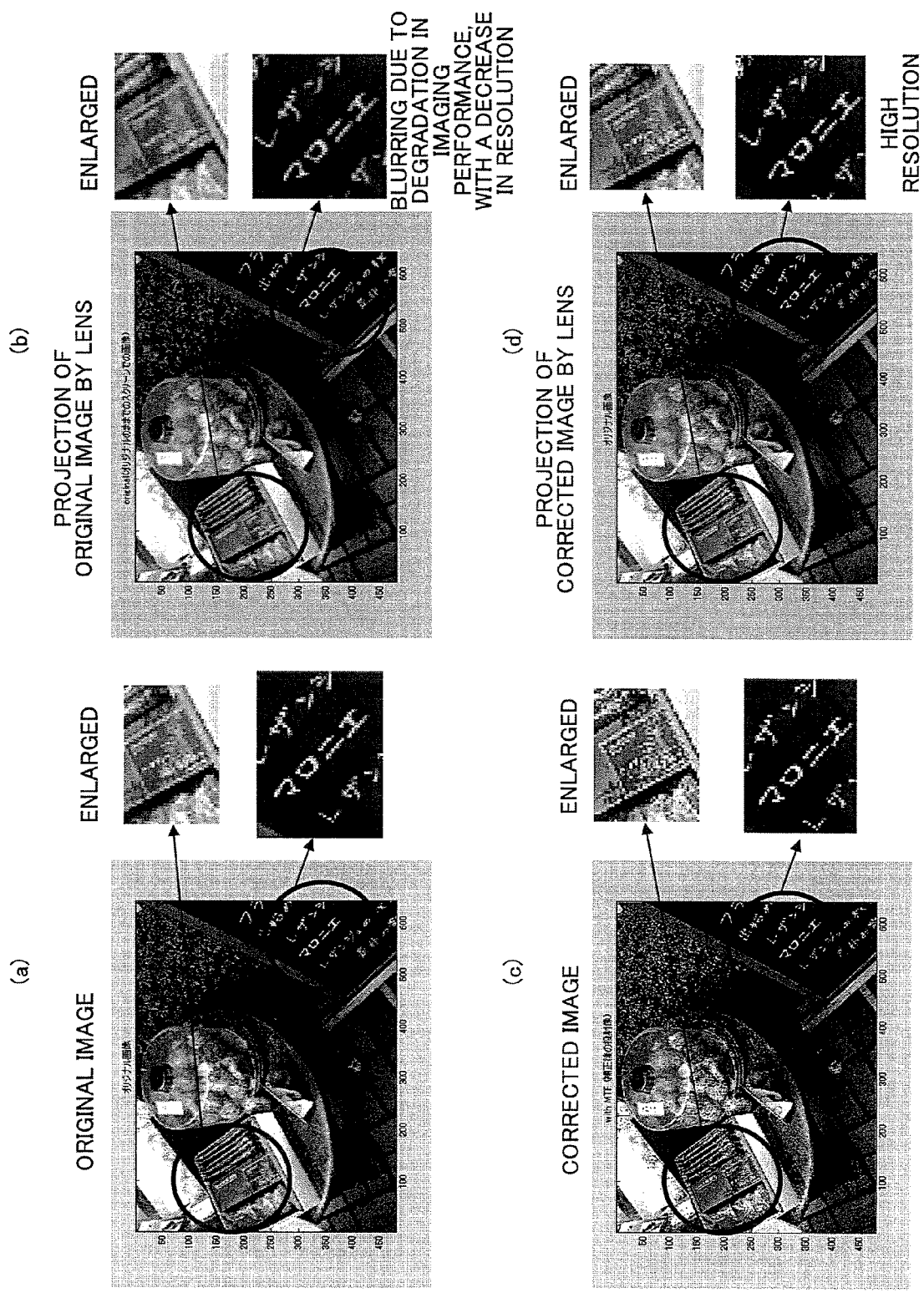
FIG. 12 shows the results of a simulation of image processing according to the embodiment shown in FIG. 4(c).

FIG. 12 shows the results of a simulation of the present embodiment. FIG. 12(a) shows an original image 15. If the original image 15 is projected as is, an image of FIG. 12(b) is obtained, in which blurring is produced by the imaging performance of the lens, resulting in a decrease in resolution. FIG. 12(c) shows an image produced by the image generator following image processing in the image processing device using an inverse filter adapted to compensate for the drop in the lens MTF. This image information after the image processing is sent to the liquid crystal light modulating device 3 in the form of an image signal 14. The light flux is modulated by the liquid crystal light modulating device 3 and then projected by the projection lens 4, resulting in an image of FIG. 12(d). It can be seen that resolution is enhanced and the image is of high quality compared with FIG. 12(b). It is noted that although FIG. 12 is in monochrome, the actual images are implemented in color.

Embodiment 3

In Embodiment 3, the illumination optical system of the projector of Embodiment 1 is additionally provided with a device to control the distribution of light amount. The light-amount distribution controller may comprise a device to achieve a uniform light amount, such as the already-described rod integrator, which equalizes the distribution of light amount in a cross section perpendicular to the flux of light. Preferably, the illumination optical system also comprises, in addition to the aforementioned light-amount equalizer, a light-amount distribution converter for obtaining a light-amount distribution such that, in a cross section perpendicular to the flux of light, the light amount increases from the optical axis center toward the peripheral portion. One example of such a light-amount distribution converter is a light-amount distribution conversion element 5 shown in FIG. 2. Conventional illumination optical systems have been configured such that the light modulating device is uniformly illuminated. In accordance with the present embodiment, a flux of light having a uniform light-amount distribution is obtained with the rod integrator 2. Further, from this flux of light with the uniform light-amount distribution, a flux of light having a desired light-amount distribution is produced. Such a light-amount distribution conversion element can be used for correcting the aberration caused by the decrease in the number of lenses, as required in a small projection lens.

Light-Amount Distribution Controller

Figure 3:
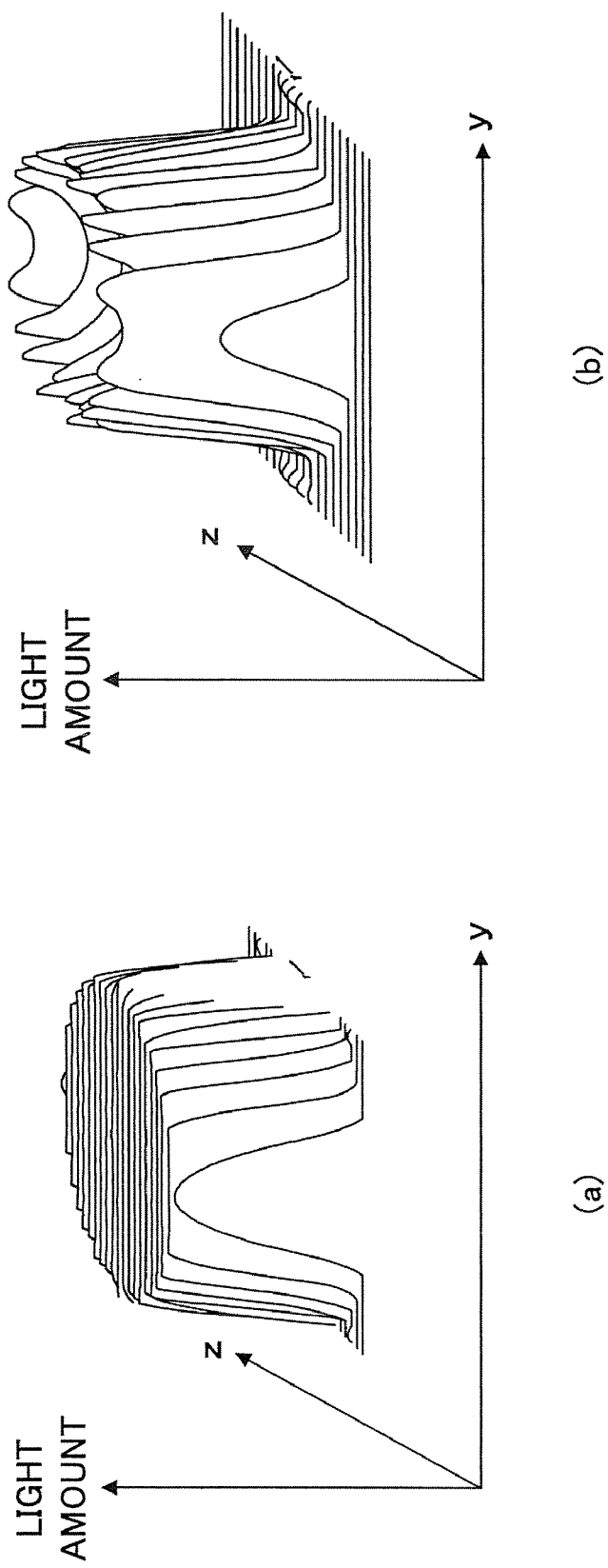
FIG. 3 shows light-amount distributions according to an embodiment of the invention.
Figure 13:
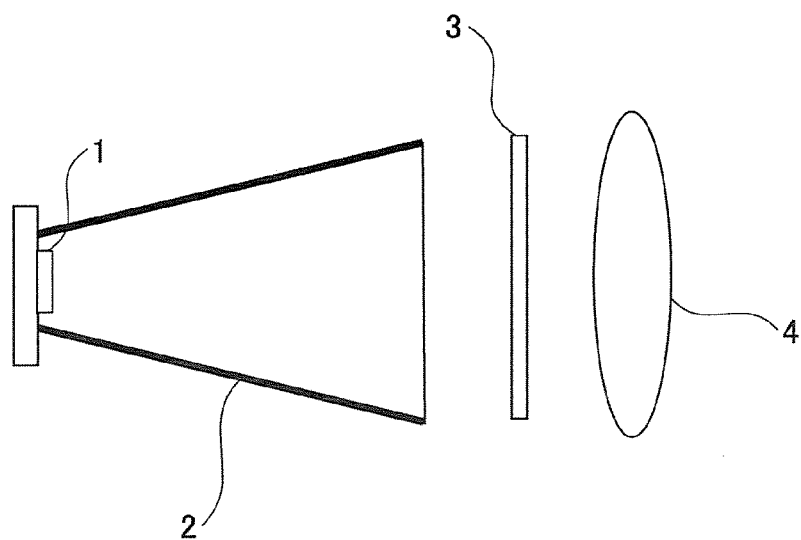
FIG. 13 schematically shows an illumination optical system according to another embodiment of the invention.
Figure 15:
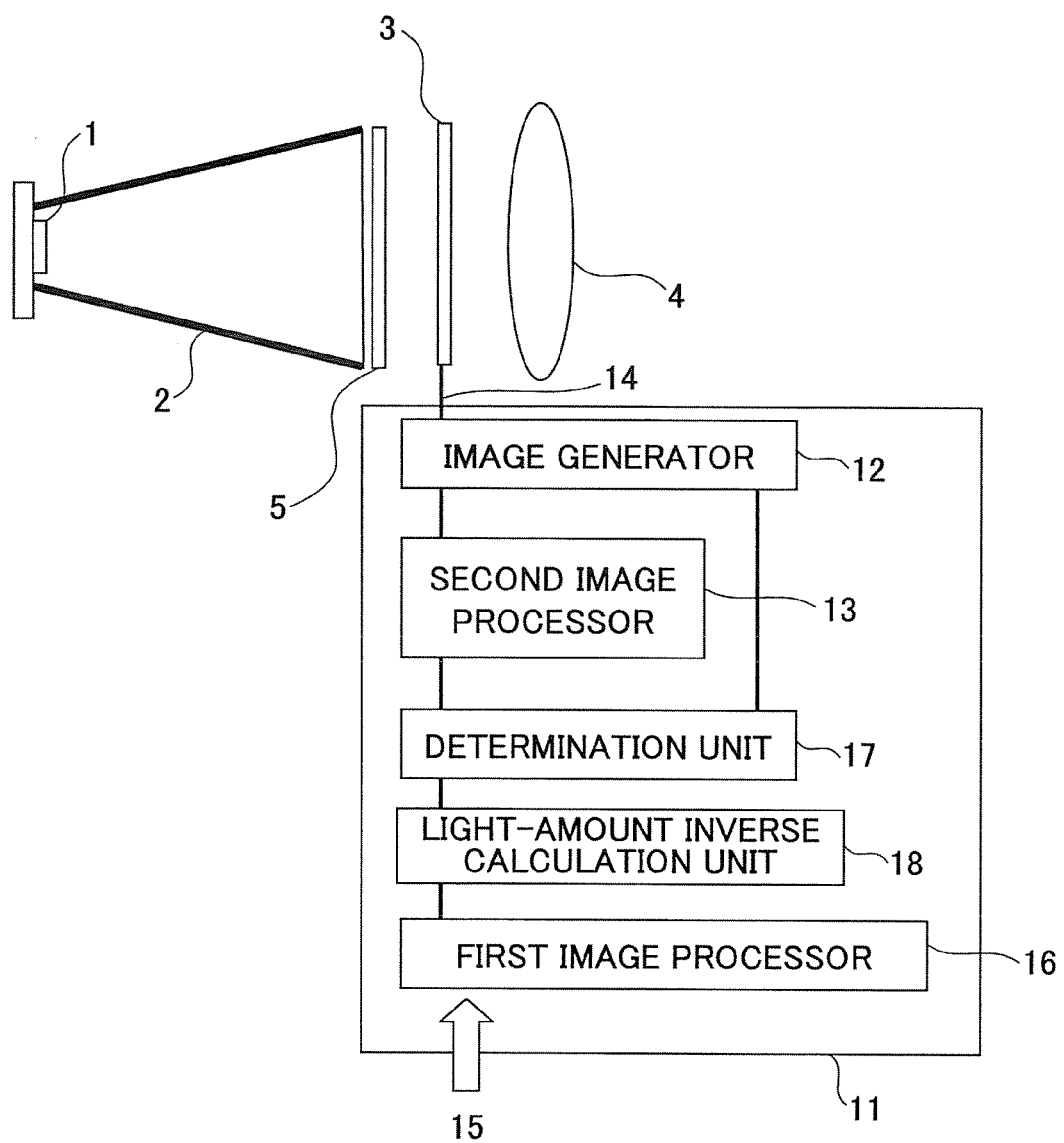
FIG. 15 shows a projector according to another embodiment of the invention.

FIG. 3 shows the distribution of the light amount in the flux of light before and after the light-amount distribution conversion element 5 in the illumination optical system of the projector shown in FIG. 15. The flux of light incident on the light-amount distribution conversion element 5 is emitted from the rod integrator 2 substantially uniformly, as shown in FIG. 3(a). The flux of light with such a uniform light-amount distribution is converted by the light-amount distribution conversion element 5 such that the intensity increases from the optical axis center toward the peripheral portions, as shown in FIG. 3(b). The flux of light with the thus converted distribution of light amount is shone on the liquid crystal light modulating device 3. In the present embodiment, the light modulating device employs the transmission-type liquid crystal light modulating device 3. This, however, is merely an example, and other types of light modulating device, such as a reflecting-type liquid crystal light modulating device 3, a DMD, and the like, may be employed. In another embodiment, the light-amount distribution converter may be provided by the rod integrator 3 alone, as shown, e.g., in FIG. 13, without providing a separate light-amount distribution control element.

Figure 14:
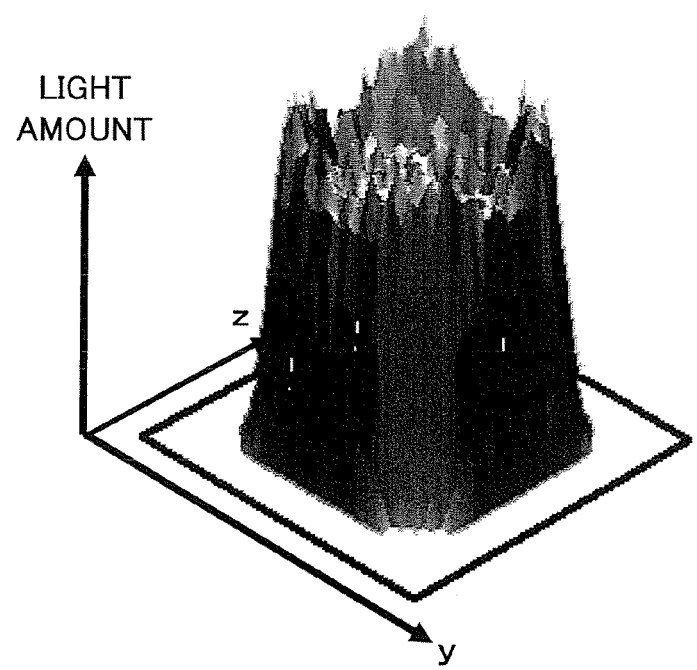
FIG. 14 shows a light-amount distribution in another embodiment of the invention.

Specifically, it is possible to increase the light amount at the peripheral portions, as shown in FIG. 14, by adjusting the angle of tapering of the rod integrator 3, the length thereof, or its positional relationship with the light source. In this case, the rod integrator 3 provides the function of the light-amount distribution controller. The light-amount distribution conversion element is not limited to refracting systems, such as the aforementioned lens; other elements, such as diffracting elements, may be used.

Light-Amount Distribution Conversion Lens

Figure 2:
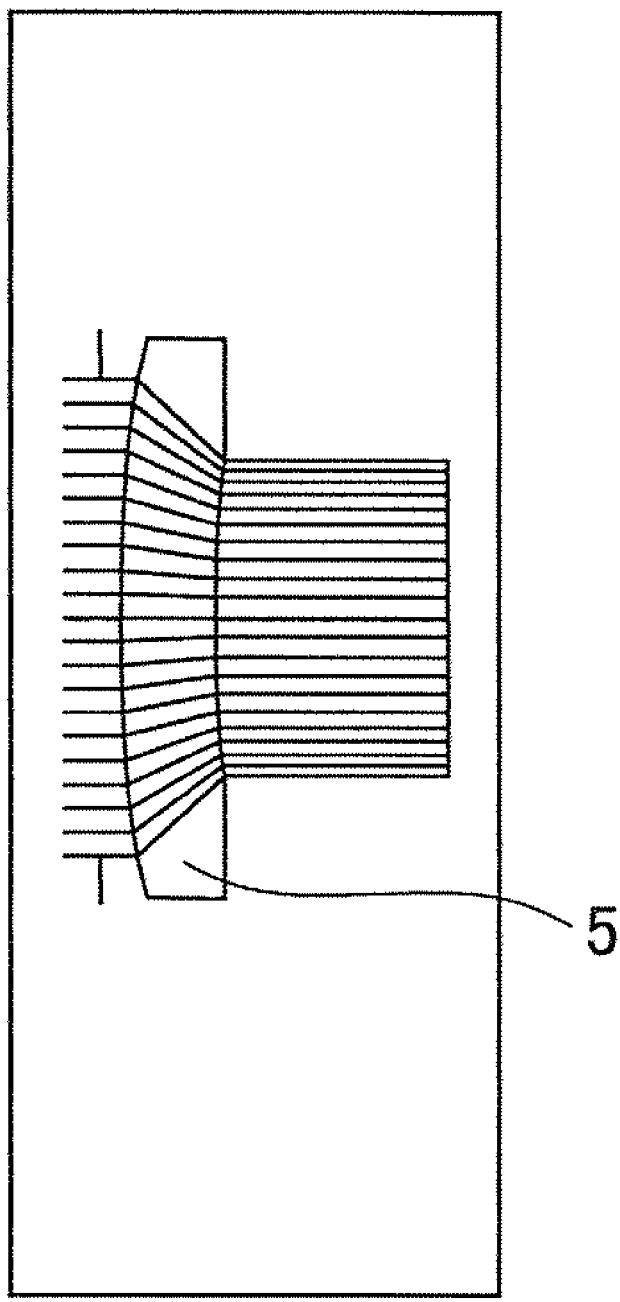
FIG. 2 shows a light-amount distribution conversion element used in another embodiment of the invention.

FIG. 2 shows a bispheric lens as an example of the light-amount distribution conversion element. In an orthogonal coordinate system having the apex of a surface as the origin, where the +X axis lies in the direction of the optical axis from the light source to the projection surface, the aspherical shape is expressed, based on the relationship between distance x in the optical axis direction of the plane and radius R, by the following equations:

$$x = \frac{\frac{1}{r}R^2}{1 + \sqrt{1-(1+x)\frac{1}{r^2}R^2}} + AR^4 + BR^6 +$$

$$CR^8 + DR^{10} + ER^{12} + FR^{14} + GR^{16} + HR^{18} + JR^{20} + \ldots$$

$$R = \sqrt{y^2 + z^2}$$

where r is the paraxial radius of curvature, k is a conic constant, A, B, C, D, E, F, G, H, J, . . . are aspherical coefficients, x is the distance in the optical axis direction of the plane, y is the distance perpendicular to the optical axis of the plane, and z is the distance perpendicular to the optical axis direction of the plane and perpendicular to the y-axis.

Tables 1 and 2 show the surface data for the individual surfaces and regions of the aforementioned bispheric lens.

TABLE 1

| Surface No. | Surface type | Radius of curvature (mm) | Surface interval (mm) | Glass |
|---|---|---|---|---|
| 1 | Aspherical | 8.3657 | 4 | BK7 |
| 2 | Aspherical | 6.9675 | | |

TABLE 2

| Aspherical coefficient | Surface 1 | Surface 2 |
|---|---|---|
| K | 0 | 0 |
| A | $0.441345 \times 10^{-2}$ | $0.855308 \times 10^{-2}$ |
| B | $-0.131602 \times 10^{-3}$ | $0.116000 \times 10^{-2}$ |
| C | $0.159172E \times 10^{-4}$ | $-0.319656 \times 10^{-3}$ |
| D | $-0.359637 \times 10^{-6}$ | $0.842558 \times 10^{-4}$ |

Thus, by increasing the light amount in the peripheral portions, as opposed to the uniform flux of light often found in conventional image projecting apparatuses, it becomes possible to compensate for the degradation in the projected image due to the drop in resolution, distortion, chromatic aberration of magnification, aberration, and the like, which are caused by the reduction in size and simplification of the projection lens.

Image Processing

Figure 11:
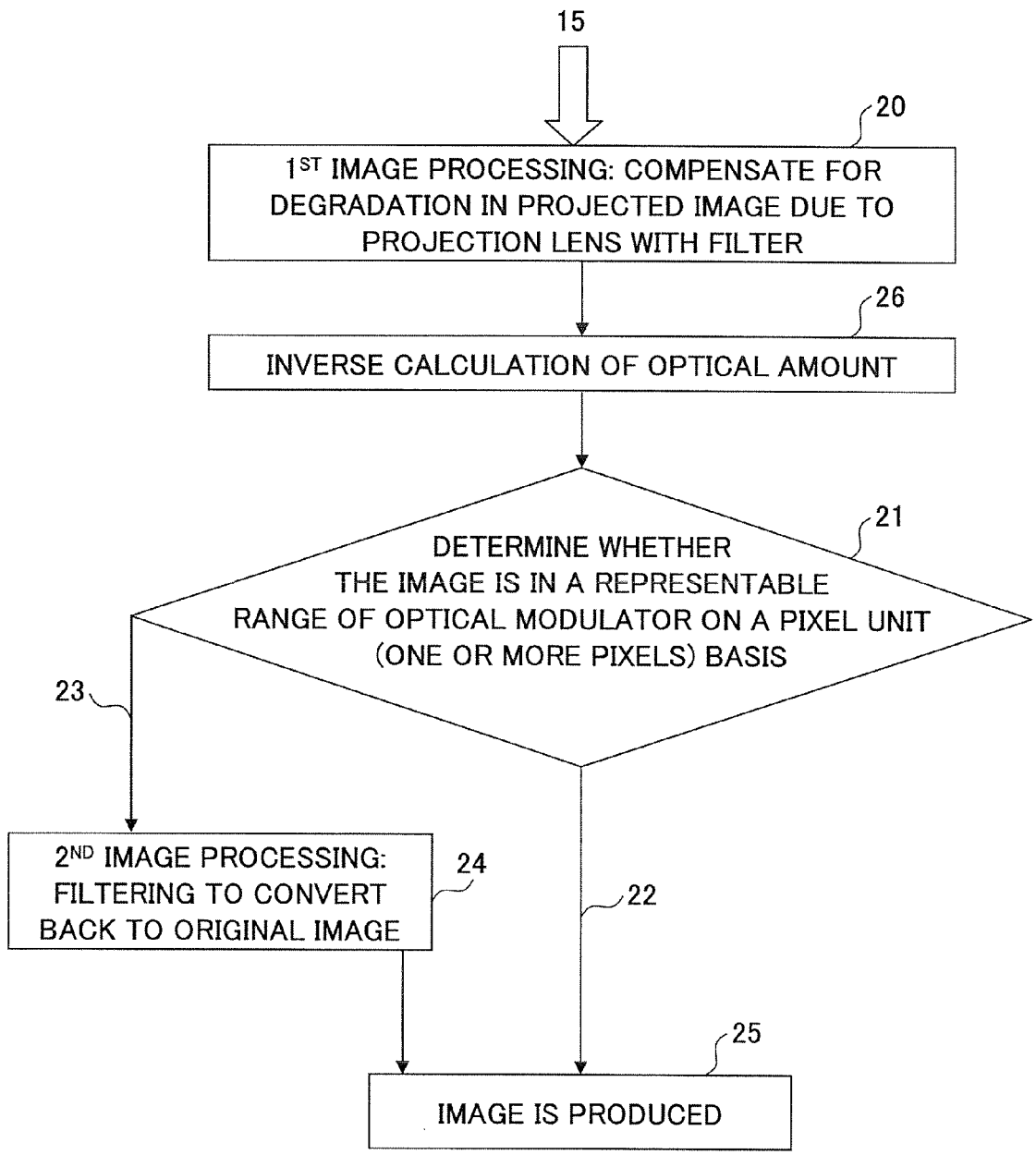
FIG. 11 shows a flowchart of image processing according to the embodiment shown in FIG. 4(b).

FIG. 11 shows a flowchart of the image processing in the present embodiment. The original image 15, which is the image information fed to the projector, is subjected to inverse filtering in the first image processor so as to compensate for the degradation in the projected image caused by the projection lens (step 20). In this step, the inverse filtering with respect to the drop in the MTF of the projection lens as described with reference to Embodiment 1, for example, may be used. Then, the inverse-filtered image information is subjected to a light-amount inverse calculation on an individual image region basis, so that the image information regional sets have inverse values with respect to the light-amount distribution of the flux of light with which the light modulating device 3 is irradiated by the irradiation optical system (step 26). It is then determined whether the result is within the representable modulation range of the light modulating device on a pixel unit region basis (step 21). In the present example, the unit of pixel region for the determination is 2 pixels×2 pixels=4 pixels. If the inverse-filtered image is within the representable range of the light modulating device, the image information is sent to the image generator as is. If it is outside the representable range, the image information is subjected to the filtering process in the second image processor, whereby the image information is converted back to its original image levels (step 24). Thereafter, the image information is sent to the image generator, and composed with the representable image information in the modulating device, thereby producing an image signal representing the final image information (step 25).

Figure 5:
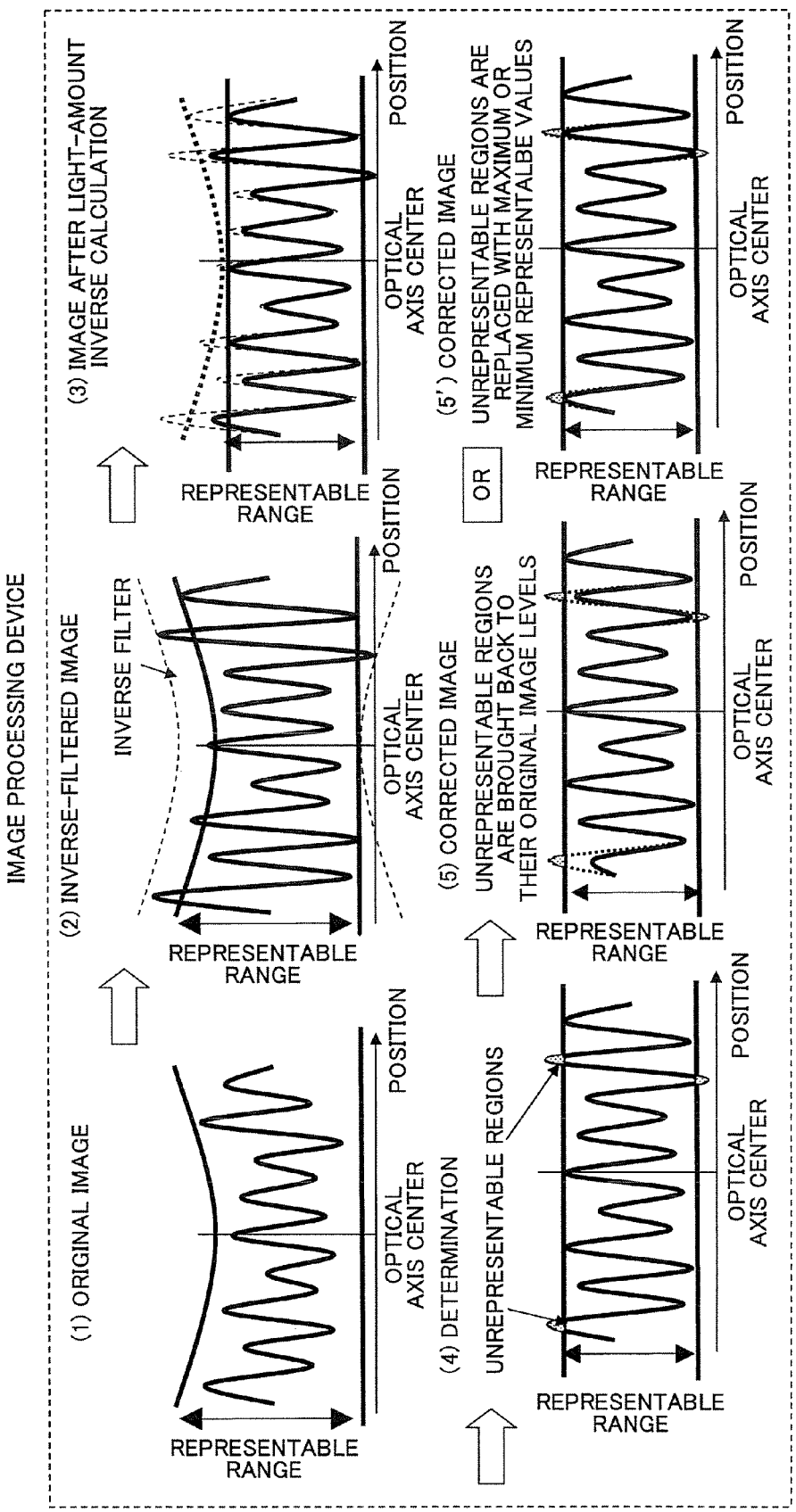
FIG. 5 illustrates the concept of image processing according to an embodiment of the invention.

The process is further described in greater detail with reference to FIG. 5. The original image (1) having greater light amounts in the peripheral portions is inverse-filtered in the light-amount distribution conversion element, resulting in the inverse-filtered image information (2). The inverse filtering involves an inverse calculation with respect to the drop in the MTF of the lens. In order to determine whether the image information is representable, an inverse calculation process is performed (3) so as to cause the image information to have inverse values with respect to the light-amount distribution of the illumination flux of light. Then, an underflow portion that drops below the lower limit of the representable modulation range, or an overflow portion exceeding the upper limit of the representable modulation range, is determined on a pixel unit region basis (4), and the underflow or overflow region alone is determined to be an unrepresentable region. In the second image processing (5), the image information in the unrepresentable region is modified to the original image level, so as to avoid the overflow or underflow. Thus, the same second image processing as that of Embodiment 1 is carried out with respect to the underflow or overflow portion alone, on a pixel unit region basis. Based on the image information that has been subjected to the second image processing, a projected image can be obtained using the image projection apparatus of FIG. 15 which, though not a perfect reproduction of the original image, is of high quality.

Alternatively, with regard to the unrepresentable regions in the corrected image (5'), the overflows may be replaced with the maximum representable value and the underflow may be replaced with the minimum representable value, as described with reference to In the case of a color projector, if a region is determined to be unrepresentable in any one of the colors of RGB, preferably the same region is also determined to be unrepresentable for the other colors and the image information is subjected to the second image processing. In this case, in accordance with the image processing method described with reference to the above-described color projector, in the color in which the unrepresentable region has initially been detected, preferably an overflow portion is replaced with the representable maximum value, and an underflow portion is replaced with the representable minimum value. In the other colors, the image information is replaced with values such that the RGB ratio of the original image can be maintained. Alternatively, with regard to a pixel region in which it is determined that the image information is outside the unrepresentable range even in one color, the image information for all of the colors may be converted back to the image information prior to the first image processing. By thus performing the second image processing, the RGB balance can be maintained, so that good color reproducibility can be obtained.

Compensation of Imaging Performance by the Light-Amount Distribution Control

When the foregoing image processing device is employed wherein it is determined whether the image information is representable by the light modulating device on a pixel unit region basis, and an identified pixel region is subjected to the second image processing, a pixel region that is representable by the light modulating device without the second image processing enables superior imaging performance. Thus, by increasing the representable range of the light modulating device, particularly with respect to a region in which the degradation in the MTF of the projection lens is large, better projected-imaging performance can be obtained in the projector. In other words, by increasing the dynamic range of the black and white levels (or the optical luminance levels in the case of colored light) of the original image that can be entered in the light modulating device, an image with higher quality can be provided.

Normally, if the field angle of a projection lens is increased, its MTF is degraded, and this tendency becomes more pronounced as the number of lenses decreases. The image information that has been processed by the first image processor in order to compensate for such degradation in the MTF tends to become increasingly enlarged toward the peripheral portions of the image. Thus, by increasing the amount of light in regions with greater field angles, i.e., the peripheral portions of the light modulating device, the representable range of the light modulating device in the peripheral portions thereof can be increased. In this way, the substantial representable range of the light modulating device can be expanded. For this purpose, it is effective to employ, as in the present embodiment, an illumination optical system configuration such that the light amounts in the peripheral portions are greater, as opposed to the uniform distribution of light amounts.

The corrected images (3) shown in FIGS. 4(b) and (c) were obtained with the use of illumination light having a uniform light-amount distribution in the flux of light from the irradiation optical system. The corrected images (5) and (5') shown in FIG. 5 were obtained with the use of the illumination light having greater light amounts in the peripheral portions where the degradation in the MTF of the projection lens is more pronounced. It can be seen that there are less unrepresentable regions in the latter; therefore, the latter enables a more accurate reproduction of the original image (1), thus providing a finer projected image.

Figure 16:
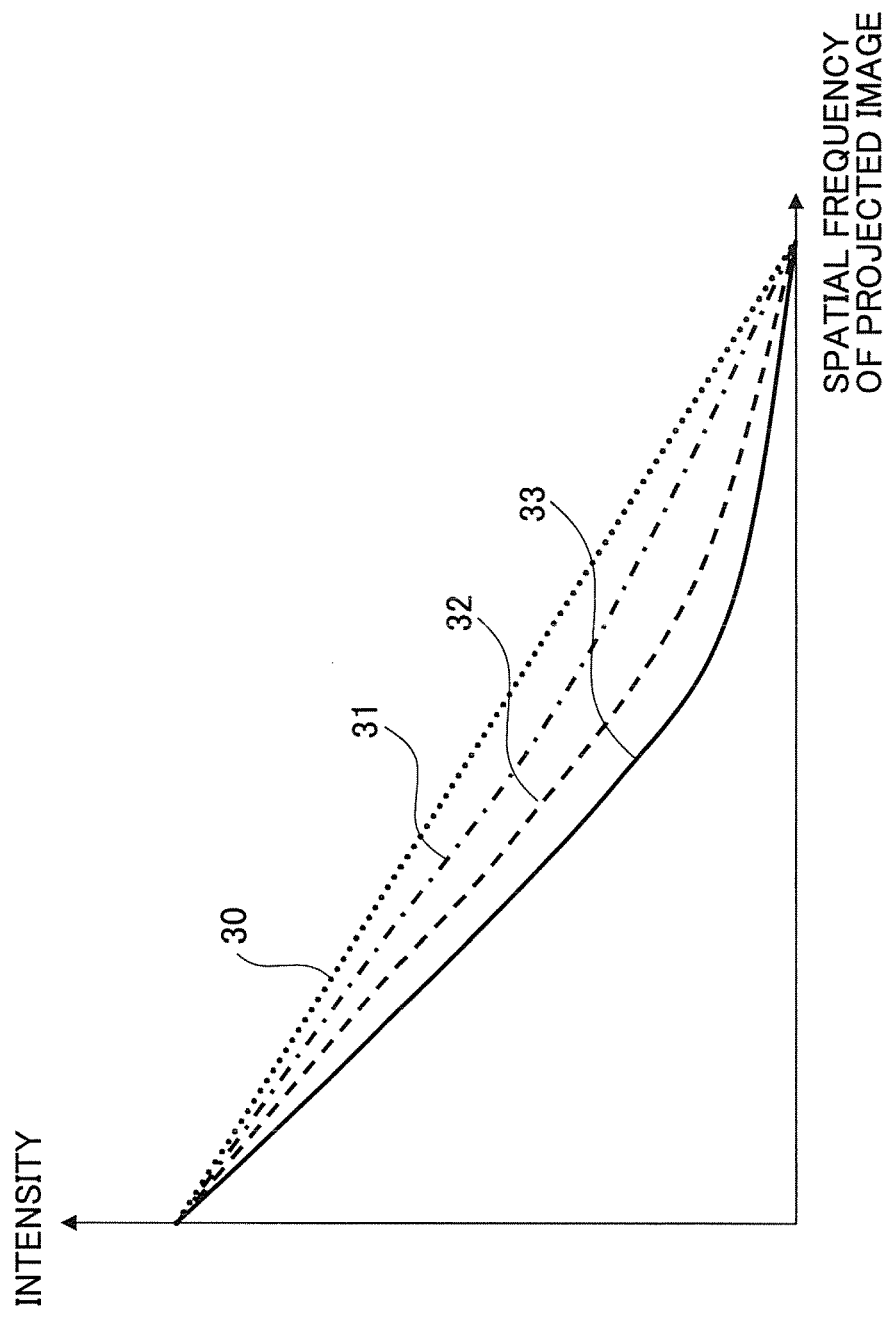
FIG. 16 shows the results of a Fourier-transform of projected images according to prior art and various embodiments of the invention.

FIG. 16 shows the results of a Fourier transform of projected images. The horizontal axis shows the spatial frequency of the projected image; the vertical axis shows the intensity. An original image 30, indicated by the dotted line in the chart, consists of an image that is linear with respect to the spatial frequency. When the original image 30 is projected with a projection lens, the intensity decreases towards the high-frequency components, as shown by a solid line 33 in the figure. This is due to the degradation in the imaging performance of the lens, and the decrease indicates the blurring in the projected image. When a projected image is produced based on the image information subjected to the first and second image processings in accordance with Embodiments 1 and 2, the blurring in the projected image due to the degradation in imaging performance is corrected, as shown by a dashed line 32, enabling the provision of a higher-quality image. A dashed-dotted line 31 in the chart indicates a projected image based on the image information that has been subjected to the first and second image processings, using an illumination optical system in accordance with Embodiment 3, which provides greater light amounts in the peripheral regions. In this case, the blurring in the image due to the degradation in imaging performance is further corrected, whereby a still higher-quality image that is even closer to the original image 30 can be obtained.

Thus, in accordance with the invention, the projector is designed comprehensively in view of the imaging performance of the projection lens and the image processing method, so as to achieve enhanced projected-imaging performance. This is in contrast to conventional approaches whereby the illumination optical system, image processing device, light modulating device, and projection optical system are separately optimized.

Embodiment 4

Figure 7:
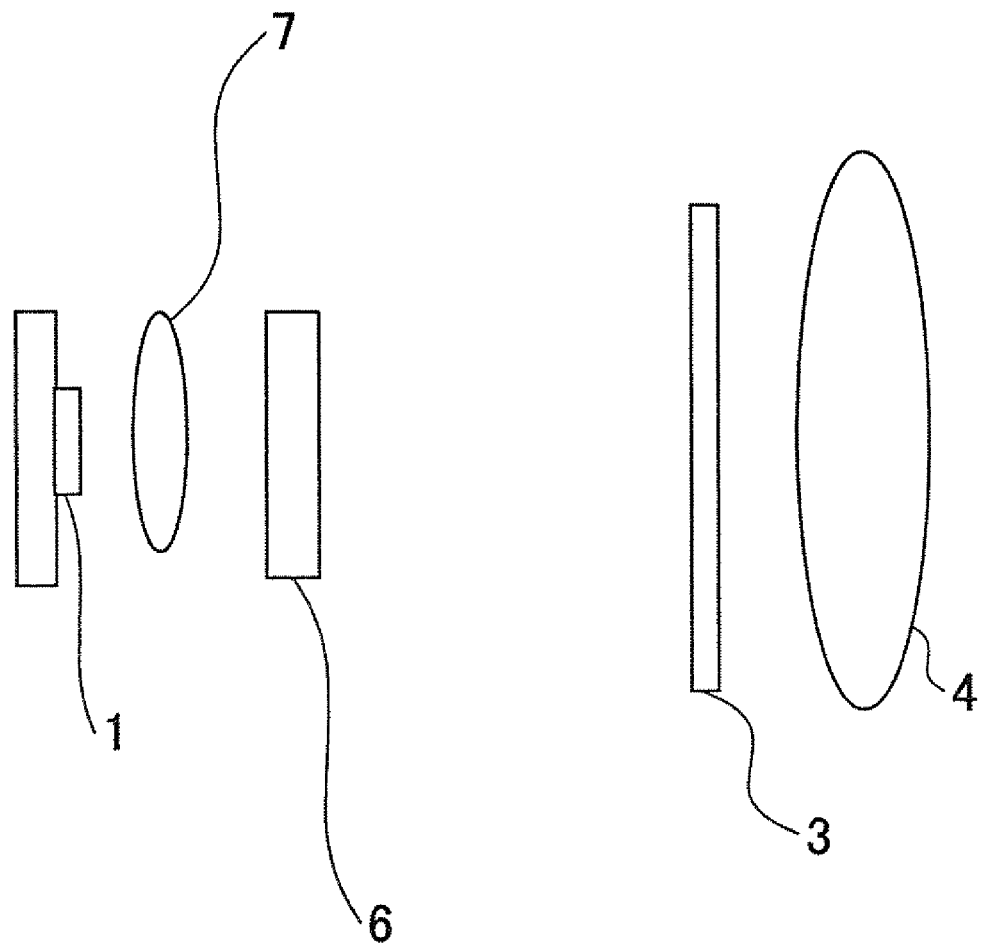
FIG. 7 schematically shows an illumination optical system and a projection optical system according to another embodiment of the invention.
Figure 8:
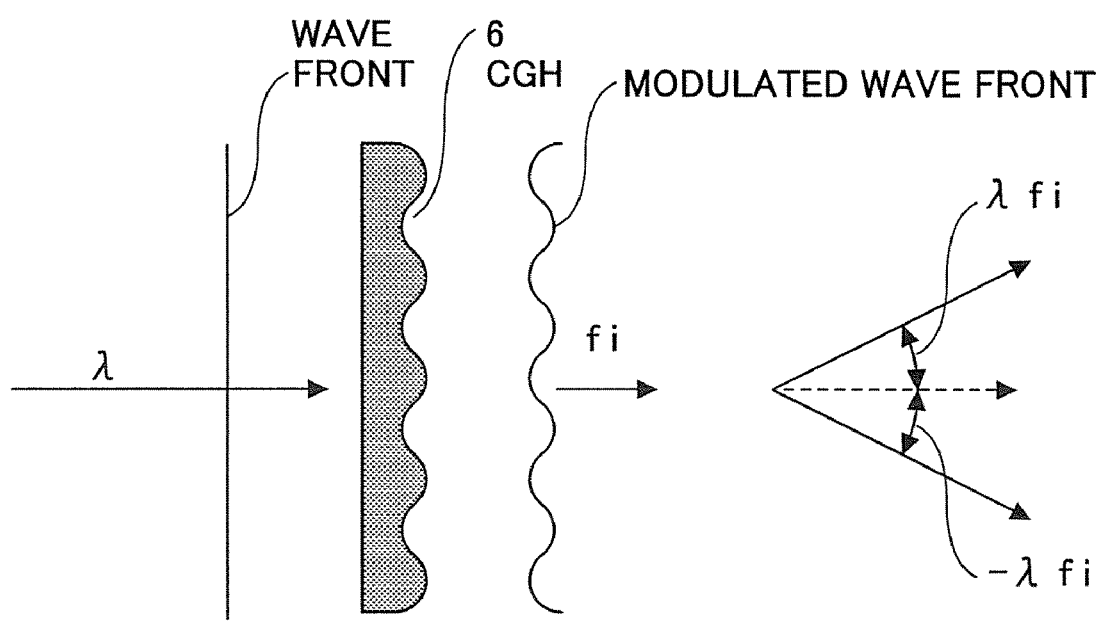
FIG. 8 illustrates the principle of the hologram.

FIG. 7 schematically shows a projector according to another embodiment. The projector employs a hologram optical element 6 in its illumination optical system. Basically, a hologram is a dry plate on which an interference pattern (amplitude and phase) of two beams of light is recorded. In the present embodiment, a computer-generated hologram (CGH) element, on which a computed digital pattern is recorded, is preferably used. The principle of the hologram is illustrated in FIG. 8. As a laser beam of light with wavelength λ becomes incident on a phase plate modulated with frequency fi, the beam is divided in two directions at angles λfi and −λfi. The CGH, which is a type of diffractive-optical element, gives a periodic optical-path difference with respect to the wave front of the incident laser beam; thus, it can be considered a phase plate that provides spatial modulation in directions in which the light beam is desired to propagate. By modulating the laser light with a number of frequencies f1, f2, f3, . . . , simultaneously based on the superposition principle, the light beam can be divided in the directions corresponding to the individual frequencies.

The hologram optical element is designed by a computer such that the Fourier-transform spectrum of a hologram pattern has a sharp peak at the frequency corresponding to the position at which an image is to be placed. For example, the hologram optical element may consist of a transmission phase hologram of a surface-relief type (kinoform), which is formed by directly etching glass to provide it with multi-stepped phase differences. Normally, a hologram pattern is composed of 256×256 to 1024×1024 pixels, each pixel consisting of a square of 1 to 2 µm.

In actual calculations, individual pixels are initially provided with random phases. Then, an error function (evaluation function) is set such that it can be determined that a target value is being approached when a Fourier-transform spectrum has a high peak at a required frequency. Thereafter, a convergence calculation is performed such that the error function can be minimized by sequentially exchanging the phases of the individual pixels.

In FIG. 7, since the beam of light emitted by the light source is preferably a parallel beam of light, the light beam emitted by the light source 1 is rendered into a parallel beam of light by a collimating lens 7. Because the hologram optical element 6 is a device for causing the incident light to propagate in different directions at predetermined angles with respect to the direction of propagation of the incident light, the light beam emitted by the light source 1 should have a high degree of parallelism.

Thus, by spatially modulating, i.e., changing the direction of propagation of, the light beam from the light source 1 with the computer-designed hologram optical element 6 based on the hologram principle, it becomes possible to irradiate the liquid crystal light modulating device 3 with a flux of light having no intensity irregularities and whose optical-density distribution is adjusted as desired.

Although the invention has been shown and described with reference to certain preferred embodiments thereof, it should be obvious that equivalents and modifications may occur to one skilled in the art without departing from the spirit and scope of the invention as defined by the appended claims.

The present application is based on the Japanese Priority Application No. 2006-310602 filed Nov. 16, 2006, the entire contents of which are hereby incorporated by reference.

What is claimed is:

1. An image projecting apparatus, comprising:
an illumination optical system configured to emit a flux of light;
an image processing device configured to process image information;
a light modulating device configured to modulate the flux of light emitted by the illumination optical system based on the image information processed by the image processing device; and
a projection optical system configured to project the flux of light modulated by the light modulating device on a screen to form a projected image;
wherein the image processing device comprises
a first image processor configured to process the image information on a pixel unit region basis, each pixel unit consisting of one or more pixels, so as to compensate for degradation in the image projected by the projection optical system;
a determination unit configured to determine whether the image information processed by the first image processor on a pixel unit region basis is within a representable modulation range of the light modulating device; and
a second image processor configured to process a part of the image information in a pixel region that is determined to lie outside the representable range;
wherein the second image processor converts the part of the image information in the pixel region determined to lie outside the representable modulation range back to its original image information prior to the image processing by the first image processor; and
plural image processing devices, one for each of two or more colors,
wherein, in a pixel region where the part of the image information processed by the first image processor of a first image processing device for a first color is not within the representable modulation range, the second image processor of the first image processing device converts the part of the image information in the aforementioned pixel region back to its original image information prior to the image processing by the first image processor of the first image processing device,
and the second image processor of a second image processing device for a second color processes a part of the image information for the second color processed by the first image processor of the second image processing device that is in the same aforementioned pixel region with the same ratio of change as the ratio of change introduced into the part of the image information for the first color in the pixel region by the processing by the second image processor of the first image processing device.

2. An image projecting apparatus, comprising:
an illumination optical system configured to emit a flux of light;
an image processing device configured to process image information;
a light modulating device configured to modulate the flux of light emitted by the illumination optical system based on the image information processed by the image processing device; and
a projection optical system configured to project the flux of light modulated by the light modulating device on a screen to form a projected image;
wherein the image processing device comprises
a first image processor configured to process the image information on a pixel unit region basis, each pixel unit consisting of one or more pixels, so as to compensate for degradation in the image projected by the projection optical system;
a determination unit configured to determine whether the image information processed by the first image processor on a pixel unit region basis is within a representable modulation range of the light modulating device; and
a second image processor configured to process a part of the image information in a pixel region that is determined to lie outside the representable range;
wherein the second image processor allocates an upper limit value of the representable modulation range to the part of the image information that exceeds an upper limit of the representable modulation range, and allocates a lower limit value to the part of the image information that drops below a lower limit of the representable modulation range; and
plural image processing devices, one for each of two or more colors,
wherein, in a pixel region where the part of the image information processed by the first image processor of a first image processing device for a first color is not within the representable modulation range, the second image processor of the first image processing device allocates an upper limit value to a part of the image information that exceeds an upper limit of the representable modulation range, and allocates a lower limit value to a part of the image information that drops below a lower limit of the representable modulation range,
wherein the second image processor of a second image processing device for a second color processes a part of the image information for the second color processed by the first image processor of the second image processing device that is in the same aforementioned pixel region with the same ratio of change as the ratio of change introduced into the part of the image information for the first color in the pixel region by the processing by the second image processor.

3. The image projecting apparatus according to claim 1, wherein the illumination optical system comprises a light-amount distribution controller configured to control the distribution of light amount in the cross section perpendicular to the light flux.

4. The image projecting apparatus according to claim 2, wherein the illumination optical system comprises a light-amount distribution controller configured to control the distribution of light amount in the cross section perpendicular to the light flux.

5. A method for projecting an image on a screen using an image projecting apparatus comprising an illumination optical system configured to emit a flux of light, an image processing device configured to process image information, a light modulating device configured to modulate the flux of light emitted by the illumination optical system based on the image information processed by the image processing device, and a projection optical system configured to project the flux of light modulated by the light modulating device onto the screen to form a projected image,
the method comprising:
a first image processing step of processing the image information on a pixel unit region basis, each unit consisting of one or more pixels, so as to compensate for degradation in the projected image projected by the projection optical system;

a determination step of determining whether the image information processed by the first image processing step on a pixel unit region basis is within a representable modulation range of the light modulating device; and a second image processing step of processing the part of the image information in a pixel region that is determined to be outside the representable modulation range in the determination step; and wherein the second image processing step comprises converting the part of the image information back to its original image information prior to the first image processing step.

* * * * *